United States Patent [19]

Maples

[11] Patent Number: 4,543,732

[45] Date of Patent: Oct. 1, 1985

[54] AUTOMATIC NULLING LVDT PROBE

[75] Inventor: Stephen S. Maples, Adrian, Mich.

[73] Assignee: Acer Automation Company, Adrian, Mich.

[21] Appl. No.: 572,504

[22] Filed: Jan. 20, 1984

[51] Int. Cl.⁴ .............................................. G01B 7/00
[52] U.S. Cl. ...................................... 33/502; 33/558; 33/545; 33/172 E; 33/147 N; 73/1 J
[58] Field of Search ............ 33/172 E, 147 N, 125 R, 33/174 L; 73/1 J

[56] References Cited

U.S. PATENT DOCUMENTS

| | | | |
|---|---|---|---|
| 2,313,989 | 3/1943 | Caldwell et al. | 90/62 |
| 2,365,592 | 12/1944 | Reason | 33/147 |
| 2,437,639 | 3/1948 | Floyd | 33/147 |
| 2,583,791 | 1/1952 | Neff | 33/147 |
| 2,627,119 | 2/1953 | Graham | 33/172 |
| 2,833,046 | 5/1958 | Jeglum | 33/147 |
| 2,899,653 | 8/1959 | Capron | 33/172 E X |

Primary Examiner—William D. Martin, Jr.
Attorney, Agent, or Firm—Beaman & Beaman

[57] ABSTRACT

The invention pertains to a linear variable differential transformer (LVDT) probe utilizing a core mounting upon a sensing rod axially translatable with respect to a coil. The coil is movably supported for initially aligning the core and coil in a predetermined relationship to produce a desired electrical situation, such as a null condition, and the probe utilizes alignment means for quickly initially aligning the core and coil.

12 Claims, 4 Drawing Figures

AUTOMATIC NULLING LVDT PROBE

BACKGROUND OF THE INVENTION

A linear variable differential transformer, commonly known as an LVDT, utilizes a magnetic core axially translating within an electromagnetic coil system consisting of primary and secondary coils to produce an electrical signal which may be interpreted for a variety of purposes. For instance, LVDT's are often utilized in the gaging and measuring arts to produce an electrical signal denoting location, size or dimension.

LVDT's and electrical gaging devices take a variety of forms, such as typically shown in U.S. Pat. Nos. 2,313,989; 2,365,592; 2,437,639; 2,583,791; 2,627,119 and 2,833,046. In conventional devices, a supporting member is commonly used to support the coil, and a sensing plunger or rod is axially translatable within the coil and includes a core within the coil which affects the electromagnetic characteristics of the coil as the core is displaced and positioned therein. For setup purposes adjustment means are employed for supporting the unit at a location adjacent to the article being engaged or measured. In current systems utilizing LVDT's for measurement purposes, the probe housing is normally moved in its entirety wherein the rod upon which the core is mounted contacts a reference surface and the coil and probe housing are physically positioned with respect to the core and reference surface to produce a null condition. Thus, the probe housing, or support, must be frequently released, repositioned, and reclamped, and it is an object of the invention to provide an LVDT probe which eliminates entire probe housing repositioning and which very quickly permits the core and coil to be relatively positioned in a predetermined relationship to produce the desired electrical characteristics.

Another object of the invention is to provide an LVDT probe utilizing a core and coil wherein alignment means are employed for positioning both the core and coil relative to each other and the probe housing and a reference surface to quickly achieve a predetermined electrical condition.

Yet another object of the invention is to provide an LVDT probe wherein both the core and coil are relatively movable to each other and to the probe housing, and a biasing force connection exists between the core and coil.

A further object of the invention is to provide an LVDT probe of simple and economical construction capable of being quickly adjusted to a null position, or other predetermined electrical condition, wherein the components are readily manufacturable at reasonable cost, and the probe is easily assembled.

In one embodiment of the invention a support member in the form of a tube having open ends includes at least one bearing in which a sensing rod is axially slidable. An LVDT core is fixed to this rod. An annular coil within the tube is disposed about the rod core and is supported for axial displacement relative to the tube and the core upon friction elements.

The probe rod extends from the end of its tube, and a spring coil interconnects the rod and the coil, or coil support, wherein the rod is biased relative to the coil and predetermined axial movement of the core rod produces axial displacement of the coil.

Initial positioning of the core rod and the coil is achieved by alignment means. In one embodiment such alignment means comprises a plunger slidable within a tube engagable with reference surfaces defined upon the core rod and coil, and in another embodiment the alignment means comprises a reference surface, such as a shim, engagable by the sensing end of the core rod and a tube affixed to the coil. In either instance, the desired predetermined axial relationship of the core and coil to each other is quickly achieved, and the apparatus is fabricated of components economically manufacturable and readily assembled.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENTS

Figure 1:
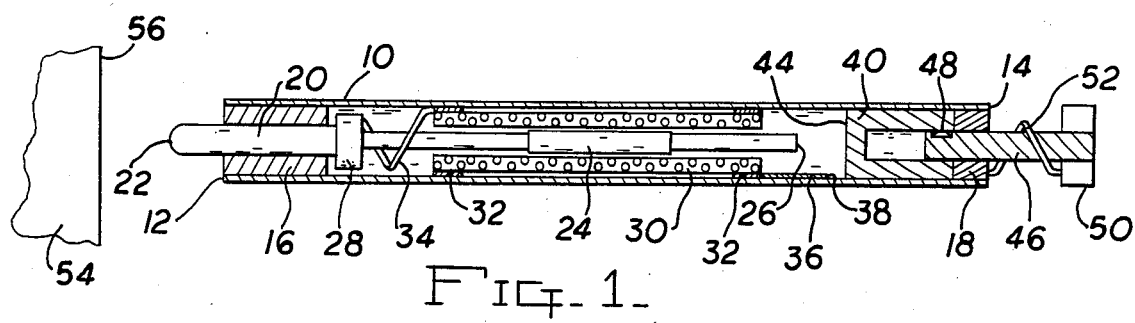
FIG. 1 is an elevational, diametrical, sectional view of an LVDT probe in accord with the invention prior to alignment of the core and coil.
Figure 2:
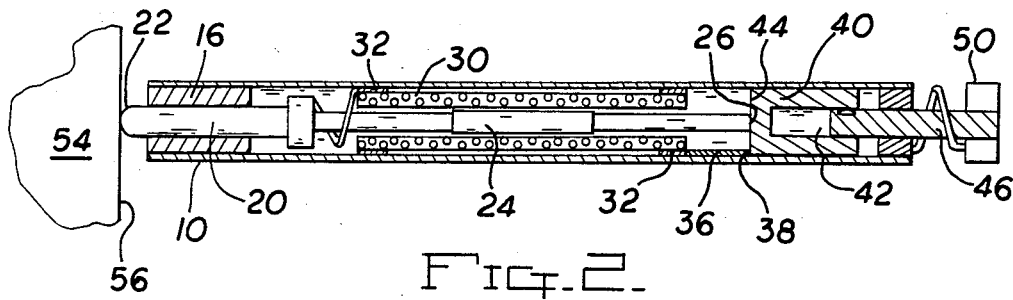
FIG. 2 is an elevational, diametrical, sectional view similar to FIG. 1 illustrating the probe in contact with the surface to be measured, and the core rod and coil being aligned by the alignment plunger.

An embodiment of the invention is illustrated in FIGS. 1 and 2 wherein the support member for the LVDT probe comprises an elongated tube 10 having a sensing end 12 and an alignment end 14. The tube includes a bearing 16 mounted adjacent the sensing end 12, and a bushing 18 is fixed within the tube adjacent the alignment end.

The probe core rod 20 is slidably received within the bearing 16 and includes a sensing end 22 adapted to extend beyond the tube end 12. The rod includes a central portion upon which the LVDT core 24 is mounted, or incorporated therein, and the other end of the rod 20 includes the reference surface 26 perpendicularly disposed to the length of the rod. A collar 28 is defined upon the rod and functions as a stop, as well as an anchor for a spring, as will be described.

The LVDT coil 30 is of an annular configuration, and includes a plurality of separate coils as is well known in the art to define primary and secondary circuits. The coil 30 is supported within the tube 10 in radial alignment with the core 24 by friction bearings 32 slidably frictionally engaging the tube inner wall for locating the coil within the tube as desired, but permitting displacement of the coil within the tube upon the application of a sufficient axial force thereto. The coil 30 is attached to the core rod 20 by a single coil compression spring 34 extending from one of the coil friction bearings 32 to the rod collar 28, and the spring 34 biases the rod to the left. An axially extending extension 36 is attached to the coil assembly, as from a friction bearing 32, and includes a reference surface 38 perpendicularly related to the tube length.

Alignment means for initially positioning the core and coil includes a plunger 40 slidably supported within the tube 10. The plunger includes a central bore 42 and a reference surface 44 lying in a plane perpendicular to the tube axis and length. An actuating shaft 46 is slidably received within the plunger bore 42 for frictional engagement therewith. A button 50 is attached to the plunger actuator 46 whereby a thumb or finger may depress the actuator shaft against the outward biasing force imposed upon the actuator shaft by the spring 52 interposed between the bushing 18 and button 50. The frictional lost motion interconnection between the actuator shaft 46 and the plunger 40 is produced by a leaf spring 48 mounted within a recess within the actuator shaft slidably engaging the plunger bore 42.

When the button 50 is depressed to move the actuator shaft 46 to the left, the plunger 40 likewise moves to the left due to the frictional connection with the actuator shaft, and the reference surface 44 will engage the rod reference surface 26, and the coil reference surface 38. The plunger 40 may be moved to the left until the rod collar 28 engages the bushing 16, or the rod end 22 engages the workpiece, the rod reference surface 26 will be in radial alignment with the coil reference surface 38 due to the mutual engagement with the plunger surface 44. Once the collar engages bearing 16 further movement of the plunger 40 is prevented, and the actuator shaft 46 will slide within the plunger bore 42 if continued axial force to the left is applied to the actuator shaft by the button 50.

The aforedescribed condition produces the secondary null condition of the probe in that the secondaries of the coil 30 are wired in series opposition and the core is now positioned such that the coupling between the coil secondaries and primary are equal. The rod and core are now set up in the center of the linear response region, and the apparatus can function as a single axis touch sensor.

If the rod end 22 is retracted to the right, such as by applying finger pressure to the end of the rod, the rod may be depressed beyond the linear range of the LVDT and a saturation condition occurs which produces no further change in the output of the secondary. As the rod 20 is moved to the right, the collar 28 will engage the left end of the coil 30 when the spring 34 is fully compressed, and the coil will move to the right.

A typical setup would consist of using the apparatus first as a contact sensor and then as a gage. In such an arrangement supporting apparatus, not shown, supports the tube 10 in proximity to the object 54 to be engaged having the surface 56 to be sensed. The button 50 is depressed to move the core rod 20 to the left, to engage the surface 56, and such movement of the plunger 40 will also move the coil 30 due to engagement of the surfaces 44 and 38. If the setup is for the purpose of using the probe as a touch sensor, there will be no reference surface for the rod end 22 to engage and the collar 28 will engage the bearing 16 to terminate the rod and coil movement under the influence of the plunger, and as the reference surfaces 26 and 38 will be in alignment, the LVDT is at null. Further depression of the actuator shaft 46 by button 50 causes the actuator shaft to slide further into the plunger bore 42, and such movement of the actuator shaft is terminated upon the button engaging the tube end 14.

When used as a gage, as in FIG. 2, the rod sensing end 22 will engage the surface 56 to be sensed when the tube 10 is oriented to surface 56 to show the "zero" reading at the null position, and as the release of the button 50 causes the plunger 40 to be retracted due to the influence of the spring 52 the initial alignment of the surfaces 26 and 38 occurring when the rod end engages reference surface 56 may change if the reference surface 56 is "over" or "under" size and the variations from the null position will be electrically indicated.

Figure 3:
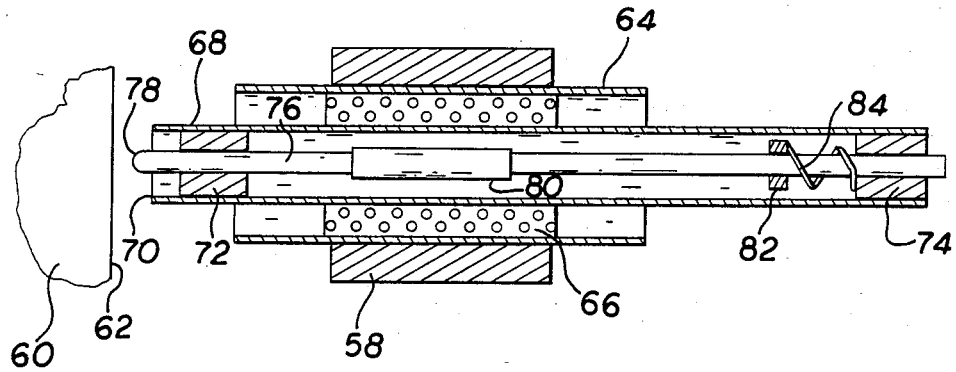
FIG. 3 is an elevational, diametrical, sectional view of another embodiment of LVDT probe in accord with the invention prior to alignment of the core rod and coil.
Figure 4:
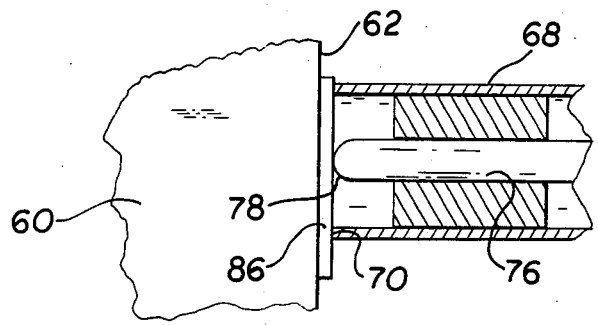
FIG. 4 is an enlarged, elevational, diametrical, sectional detail view of the left end of the probe of FIG. 3 during alignment of the rod core and coil.

Another embodiment incorporating the inventive concepts of the invention is shown in FIGS. 3 and 4. In this embodiment a mounting bracket 58 which may serve as a housing, is fixed relative to the object 60 to be measured having a surface 62. The mounting bracket slidably supports a stainless steel tube 64 in a frictional manner, and the LVDT coil 66 is fixed within the tube 64 and the inner stainless steel tube 68 is fixed to the inner diameter of the coil 66 whereby the coil 66 and tube 68 are capable of axial displacement with respect to the mounting bracket 58.

The inner tube 68 includes a reference end 70, and internally, a pair of slide bearings 72 and 74 are located adjacent opposite ends of the tube for slidably receiving the core rod 76. The rod 76 includes a sensing end 78, and the LVDT core 80 is incorporated into the rod. A collar 82 is afffixed to the rod having the compression spring 84 anchored thereto and interposed between the right bearing 74 wherein a biasing force on the rod 76 to the left is produced.

In operation, the mounting bracket 58 is firmly supported by means not shown, and the object 60 is moved toward the tube end 70 and rod end 78, or vice versa. A shim 86, FIG. 4, is inserted between the object surface 62 and the tube end 70, and the tube 68 is manually moved to the left until the tube reference end 70 engages the shim 86 at the same time that the shim is engaging the surface 62 of the object to be measured. This movement of the tube 68 is permitted by the frictional sliding relationship between the tube 64 and the support bracket 58.

With the components engaging the shim as shown in FIG. 4, the core rod 76 will be compressing the spring 84, and the sensing end 78 of the rod will be in alignment with the end of the tube 68 which produces a null condition with respect to the LVDT electrical characteristics due to the location of the core to the coil.

After the coil 66, due to the orientation achieved by the engagement of the tube 68 with the shim 86, has been "nulled" with respect to the core 80 the shim is removed, and the spring 84 will bias the rod end 78 against the surface 62 to be measured. The tube end 70 will remain a distance from the surface 62 equal to the thickness of the shim. Measurements may then be taken as compared with the "aligned" null position between the core and coil as achieved with the shim 86 as shown in FIG. 4.

Of course, it will be understood that electrical conductors are attached to the coil, and that these conductors will be attached to conventional signal analyzing and read-out indicators. These components are conventionally used with LVDT's and form no part of the invention, and are not shown for clarity of illustration.

From the above description of the disclosed embodiments it will be appreciated that the relative axial displacement of the LVDT core and coil, and the axial displacement of the coil with respect to the primary support, permits the LVDT to be very quickly oriented to the object to be measured, and the apparatus of the invention produces a simplicity of LVDT operation not heretofore achieved.

It is appreciated that various modifications to the inventive concepts may be apparent to those skilled in the art without departing from the spirit and scope of the invention.

I claim:

1. A linear variable differential transformer probe comprising, in combination, a support member, first means mounted on said support member for supporting an elongated rod, an elongated rod supported on said first means for axial movement upon said support member, a sensing end and an LVDT core defined upon said rod, second means mounted on said support member for supporting an elongated LVDT coil for axial movement parallel to said rod axial movement upon said support member, an annular elongated LVDT coil mounted on said second means disposed about said LVDT core, and alignment means initially and temporarily being functionally interposed between said rod and coil to produce a known axial relationship between said rod and coil to produce a predetermined initial electrical condition.

2. In a linear variable differential transformer as in claim 1, lost motion means interconnecting said rod and said second means whereby relative linear axial movement between said rod and said coil a predetermined distance axially translates said coil.

3. In a linear variable differential transformer as in claim 2 wherein said lost motion means comprises a spring.

4. In a linear variable differential transformer as in claim 3 wherein said spring comprises a coil compression spring.

5. In a linear variable differential transformer as in claim 1 wherein said support member comprises an elongated tube having a first end and a second end, said rod being located within said tube whereby said sensing end thereof extends from said tube first end, said first means supporting said rod comprising a bearing within said tube adjacent said first end slidably receiving said rod, said coil being located within said tube about said rod core, said second means supporting said coil comprising friction elements frictionally supporting said coil within said tube for selective axial positioning, and said alignment means comprises an axially movable plunger within said tube adjacent said second end adapted to simultaneously engage said rod and coil to produce said known axial relationship therebetween.

6. In a linear variable differential transformer as in claim 5, an actuating shaft movably mounted upon said tube adjacent said second end, and a lost motion frictional interconnection connecting said shaft to said plunger permitting alignment of said rod and coil prior to cessation of movement of said shaft.

7. In a linear variable differential transformer as in claim 1 wherein said first means supporting said rod comprises a first tube having first and second ends, bearings located within said tube adjacent said ends thereof, said rod being axially slidable supported within said bearings whereby said rod sensing end may project beyond said first end, said coil being fixed upon said first tube, said second means supporting said coil comprising a second tube coaxial with said first tube and in radial alignment therewith, said coil being fixed within said second tube, said support member slidably supporting said second tube for relative axial displacement, said alignment means engaging said rod sensing end and said first tube first end.

8. In a linear variable differential transformer as in claim 7, said alignment means comprising a reference element having a planar surface engagable with said rod sensing end and said first tube first end.

9. A linear variable differential transformer probe comprising, in combination, a support member defining a bore having a first end and a second end, a bearing within said bore adjacent said first end, a rod within said bore slidably supported for axial movement by said bearing, said rod having a sensing end adapted to project from said bore first end, an LVDT core located within said bore, and a reference surface axially spaced from said sensing end, an LVDT coil within said bore surrounding said core, friction means frictionally axially positioning said coil within said bore, a coil reference surface fixed to said coil, and movable alignment means within said bore adapted to simultaneously engage said rod and coil reference surfaces to axially position said core and coil to a predetermined initial electrical condition relationship.

10. In a linear variable differential transformer probe as in claim 9, a lost motion connector within said bore interconnecting said rod and coil.

11. In a linear variable differential transformer probe as in claim 10, said lost motion connector comprising a compression spring.

12. In a linear variable differential transformer probe as in claim 9, said alignment means comprising a plunger slidably mounted within said bore having an abutment surface adapted to engage said reference surfaces, and an actuator connected to said plunger extending from said bore second end.

* * * * *